United States Patent [19]

du Quesne

[11] 4,250,936
[45] Feb. 17, 1981

[54] RADIALLY ADJUSTABLE SUPPORT AND CLAMP FOR MOTORCYCLE WHEEL RIM

[76] Inventor: Francis du Quesne, 138, Cleistraat, 2630 Aartselaar, Belgium

[21] Appl. No.: 956,155

[22] Filed: Oct. 31, 1978

[30] Foreign Application Priority Data

Nov. 3, 1977 [BE] Belgium .................. 256391

[51] Int. Cl.³ .............................. B60C 25/06
[52] U.S. Cl. ........................ 157/17; 157/1.24
[58] Field of Search ........... 157/1.24, 1.45; 156/96; 144/288 A

[56] References Cited

U.S. PATENT DOCUMENTS

| | | | |
|---|---|---|---|
| 2,948,314 | 8/1960 | Bishman | 157/1.24 |
| 3,789,894 | 2/1974 | Adams | 144/288 A |
| 3,891,019 | 6/1975 | Holladay | 157/1.24 |
| 4,034,786 | 7/1977 | Feldman et al. | 157/1.24 |

*Primary Examiner*—W. Donald Bray

*Attorney, Agent, or Firm*—William A. Drucker

[57] ABSTRACT

A device for clamping a motorcycle wheel during fitting or removal of a tire has a base plate which can be gripped by the radially movable jaws of a conventional automobile tire fitting device, a number of arms each pivotably mounted at one end on the base plate for inward and outward radial movement of the other free end of the arm, a wheel carrier on the free end of each arm to act as a support for the motorcycle wheel laid thereon, a clamping stud on the free end of each arm to engage between the spokes of the motorcycle wheel, and a shifting device connected to the baseplate and to each of the arms for moving the free end of the arms inwardly and outwardly and to lock the arms in any position to which they are so moved, whereby the clamping studs may be moved outwardly to abut the inside periphery of the rim of the motorcycle wheel and retain the wheel firmly in position on the clamping device.

4 Claims, 2 Drawing Figures

RADIALLY ADJUSTABLE SUPPORT AND CLAMP FOR MOTORCYCLE WHEEL RIM

DESCRIPTION

The invention pertains to a device which can preferably be fixed between the jaws of the turn table of an apparatus for fitting and removing automobile tires, and by means of which it is possible easily and quickly to attach a motorcycle wheel, without distorting or damaging such a wheel.

Apparatus for the fitting and the removing of automobile tires are well known, wherein the automobile wheel is clamped between radially moving jaws which form part of a turntable which is rotated. Considering that a motorcycle wheel is of less sturdy construction than the rim of an automobile wheel, the above-stated apparatus is not appropriate for attaching a motorcycle wheel. As a solution thereto it has been suggested to fit each jaw with a second, less heavy jaw, between which the motorcycle wheel could then be clamped. There does however remain a drawback due to the fact that in consequence of the particular profile of a motorcycle tire and of the relatively thin edges of the wheel rim, a considerable axial pressure has to be exerted on the wheel in order to bring the outer edges of this rim between the jaws of the device.

A further important inconvenience is that the jaws which are usually moved radially by a motor serving to operate the device, exert a rather heavy pressure on the outer circumference of the wheel rim, so that the latter is likely in many cases to become distorted or damaged.

In order to eliminate this inconvenience, and according to the main characteristic of the invention, a device was built which consists of the combination of a base plate, which is clamped between the jaws of an apparatus for fitting and removing automobile tires, a number of arms fitted on the base plate, the free ends of which can be moved so as to be brought closer or further away from each other, a mechanism fitted between said base plate and the arms, in view of the movement and the securing in position by hand of said arms in order to fix the wheel; of a wheel carrier fitted upon the free end of each arm, upon which the wheel to be clamped is deposited horizontally; and of a clamping stud provided on the free end of each arm, said studs being inserted between the spokes of the wheel to be clamped and applied against the inner side of the rim so as to attach the wheel.

The wheel carriers upon which the wheel is deposited, assure that the latter immediately locates correctly, whereas the arrangement of the clamping studs which fit against the inner surface of the rim, and the movement by hand and the securing in position of the arms with the clamping studs, avoid that the wheel should be damaged or distorted.

According to another characteristic of the invention, the clamping studs are made of cylindrical shape and are covered with some elastic material, such as rubber for instance, so that the contact surface between the wheel and the clamping studs is reduced to a minimum and that the elastic material totally excludes that the wheel may be damaged.

By using, according to a further characteristic of the invention, three arms and three clamping studs, two of which are located at a certain distance from each other which is greater than the distance between these studs and the third clamping stud, it will always be possible to enter these studs between the spokes of the wheel, whatever the number of spokes with which the wheel is provided.

Merely as an example, and without the slightest restrictive intention, a more detailed description will be given hereinafter of a preferred form of embodiment according to the invention. This description refers to the appended drawings in which.

Figure 1:
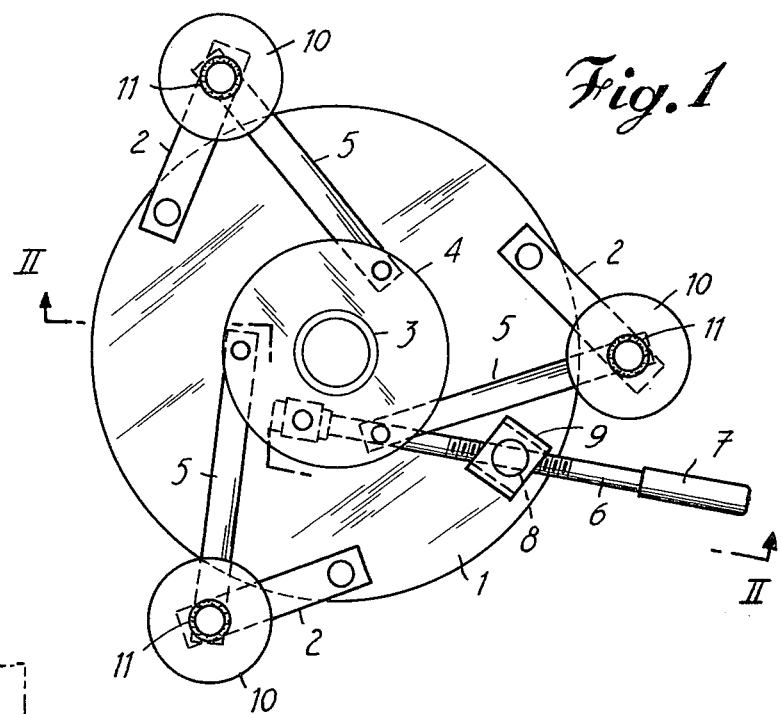
FIG. 1 shows a top view of the device.
Figure 2:
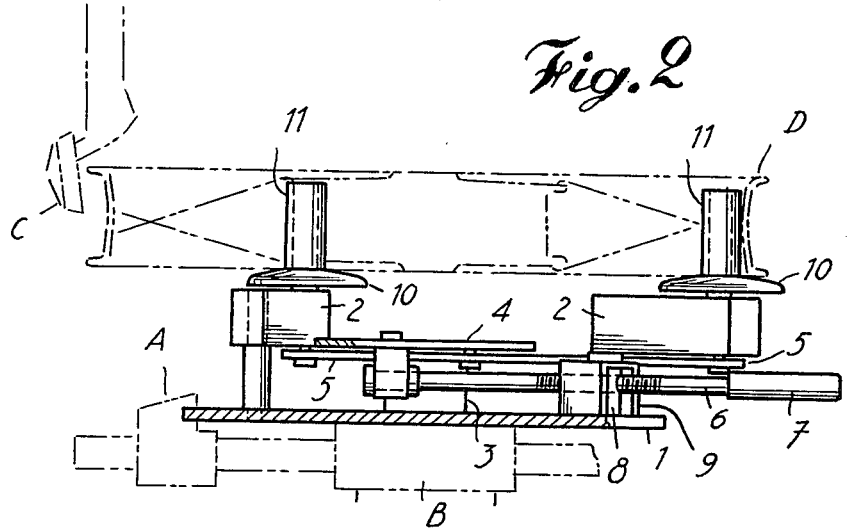
FIG. 2 shows a transverse section according to line II—II in FIG. 1.

In these figures it can be noticed that the device comprises a circular base plate 1 which is clamped between the jaws A of an apparatus B for the removing and the fitting of automobile tires, and of which the tool C is also used for removing and fitting the tire of a motorcycle wheel D. Along the circumference of said base plate 1, three arms 2 are attached so as to be able to pivot around one of their extremities. In the center of base plate 1, a hollow shaft 3 is fitted, around which a disc 4 can rotate. Connecting rods 5 link each arm 2 pivotingly to said disc. Said disc 4 is also pivotingly connected to a threaded rod 6 which can be rotated around its axis by means of a handle 7. This rod screws in a block 8 which is pivotingly attached in a support 9 which is rigidly attached to the base plate 1. The free end of each arm 2 is provided with a wheel carrier 10 in the shape of a disc, provided with a conical surface, upon which the wheel to be fixed is deposited. Each wheel carrier 10 centrally carries a cylindrical upright clamping stud 11, covered with some elastic material, such as rubber for instance, and the height of which is approximately equal to the width of the motorcycle wheel. Two of these clamping studs are fitted at a distance from each other which is greater than the distance of these studs to the third clamping stud, so that it is always possible to enter the clamping studs between the spokes of a wheel comprising a random number of spokes.

In order to fix the wheel, the threaded rod 6 is rotated about its axis by means of handle 7, in such a manner that arms 2 with clamping studs 11 are moved so as to come closer to each other, after which the wheel can easily be located on wheel carriers 10, whereby the clamping studs 11 locate between the spokes of the wheel. The threaded rod 6 is next rotated in the opposite direction, so that arms 2 move out towards the rim of the wheel and that clamping studs 11 are pressed against the inner surface of the wheel rim D. The wheel is then firmly gripped, without possibility of being distorted or damaged. Subsequently the tire may be removed from the wheel, or fitted upon it, in the well known manner by means of tool C, the entire device being driven in rotation in the well known manner by jaws A of apparatus B and with respect to tool C.

It is perfectly obvious that the shape, the dimensions and the relative arrangement of the element which have just been described may vary, that certain of these elements might well be replaced by others which serve the same purpose, and that the device itself might be completed by other elements which improve its practical performance. Similarly, the device might form part of an assembly with the tool for fitting and removing a tire on and from a wheel, without it being necessary to make use of an apparatus for fitting and removing automobile tires.

I claim:

1. A device, for clamping a motorcycle wheel having spokes and a rim, comprising:
   (i) a baseplate adapted to be clamped between the jaws of a turntable of an apparatus for fitting and removal of a tire,
   (ii) a plurality of arms each pivotably mounted on said baseplate such that a free end portion of each arm is movable radially inwardly and outwardly with respect to the center of the baseplate,
   (iii) a respective wheel carrier on said free end portion of each arm,
   (iv) a respective clamping stud extending axially from said free end portion of each arm, to engage between the spokes of the motorcycle wheel and abut against the internal periphery of the rim of the wheel,
   (v) an element mounted on the baseplate for rotation about the center thereof
   (vi) a respective link connected to said element and to the free end portion of each arm,
   (vii) a shifting means coupled to the baseplate and to said rotatable element for rotating said element to pivot said arms in unison and for locking said element in a selected position in which the clamping studs are engaged formly against the internal periphery of the wheel rim.

2. A device, as claimed in claim 1, wherein each said wheel carrier is a disc attached to the free end portion of the respective arm and having a conical bearing surface, and wherein each said clamping stud is a cylinder coaxial with said disc and covered with resiliently deformable material.

3. A device, as claimed in claim 1 or in claim 2, having three said arms each with a respective clamping stud, two of said clamping studs being disposed at a spacing from each other which is greater than the distance between either of said two studs and the third stud.

4. A device, for clamping a motorcycle wheel having spokes and a rim, comprising:
   (i) a baseplate adapted to be clamped between the jaws of a turntable of an apparatus for fitting and removal of a tire,
   (ii) a plurality of arms each pivotably mounted on said baseplate such that a free end portion of each arm is movable radially inwardly and outwardly with respect to the center of the baseplate,
   (iii) a respective wheel carrier on said free end portion of each arm, said wheel carrier being a disc having a conical bearing surface,
   (iv) a respective clamping stud extending axially from said free end portion of each arm, said clamping stud being a cylinder coaxial with said disc and covered with a resiliently deformable material, said stud being adapted to engage between the spokes of the motorcycle wheel and abut against the internal periphery of the rim of the wheel,
   (v) shifting means coupled to the baseplate and to said free end portion of each arm and serving to lock said element in a selected position in which the clamping studs are firmly engaged against the internal periphery of the wheel rim.

* * * * *